Sept. 27, 1966 W. F. BARTLETT ETAL 3,275,993

MULTIPLE SHIFT REGISTER BUFFER STORE

Filed July 1, 1963 2 Sheets-Sheet 1

United States Patent Office 3,275,993

Patented Sept. 27, 1966

3,275,993
MULTIPLE SHIFT REGISTER BUFFER STORE

William F. Bartlett, Rochester, and Barrie Brightman, Webster, N.Y., assignors to General Dynamics Corporation, Rochester, N.Y., a corporation of Delaware

Filed July 1, 1963, Ser. No. 291,656
5 Claims. (Cl. 340—172.5)

This invention relates to a buffer store for data handling systems and, more particularly, to a multiple shift register buffer store for storing binary data received from a plurality of separate input means and for supplying the stored data to utilization means on command therefrom.

Often, in data handling systems, data received from various separate incoming lines, which may be asynchronous with each other, is to be applied to some utilization means, such as outgoing lines, a modulator, a computer, etc., which also may be operated asynchronously with respect to the incoming lines. In such cases, it is necessary to apply the incoming data from each line, when received, to a buffer store and then to supply the stored data, as needed, to the utilization means on command therefrom.

Furthermore, in recent years data transmission apparatus has been developed which operate at higher and higher bit rates. It is therefore desirable that data handling systems be able to accommodate such newer high speed data transmission apparatus, without rendering obsolete the older slower speed data transmission apparatus which may already be available.

It will be seen, all other things being equal, that the storage capacity of a buffer store utilized to receive data arriving at a relatively high speed over an incoming line must be larger than the storage capacity of a buffer store receiving data arriving at a relatively low speed over an incoming line. It will be further seen that it is necessary that the write-in and read-out of data from each of the buffer stores be completely independent of each other.

It is therefore an object of this invention to provide a plurality of buffer stores utilizing the same storage medium.

It is a further object of this invention to provide a plurality of buffer stores which may have different storage capacities utilizing the same storage medium.

It is a further object of this invention to provide a plurality of buffer stores utilizing the same storage medium wherein each of the buffer stores may have information written therein or read thereout independently of each of the other buffer stores.

Figure 1:
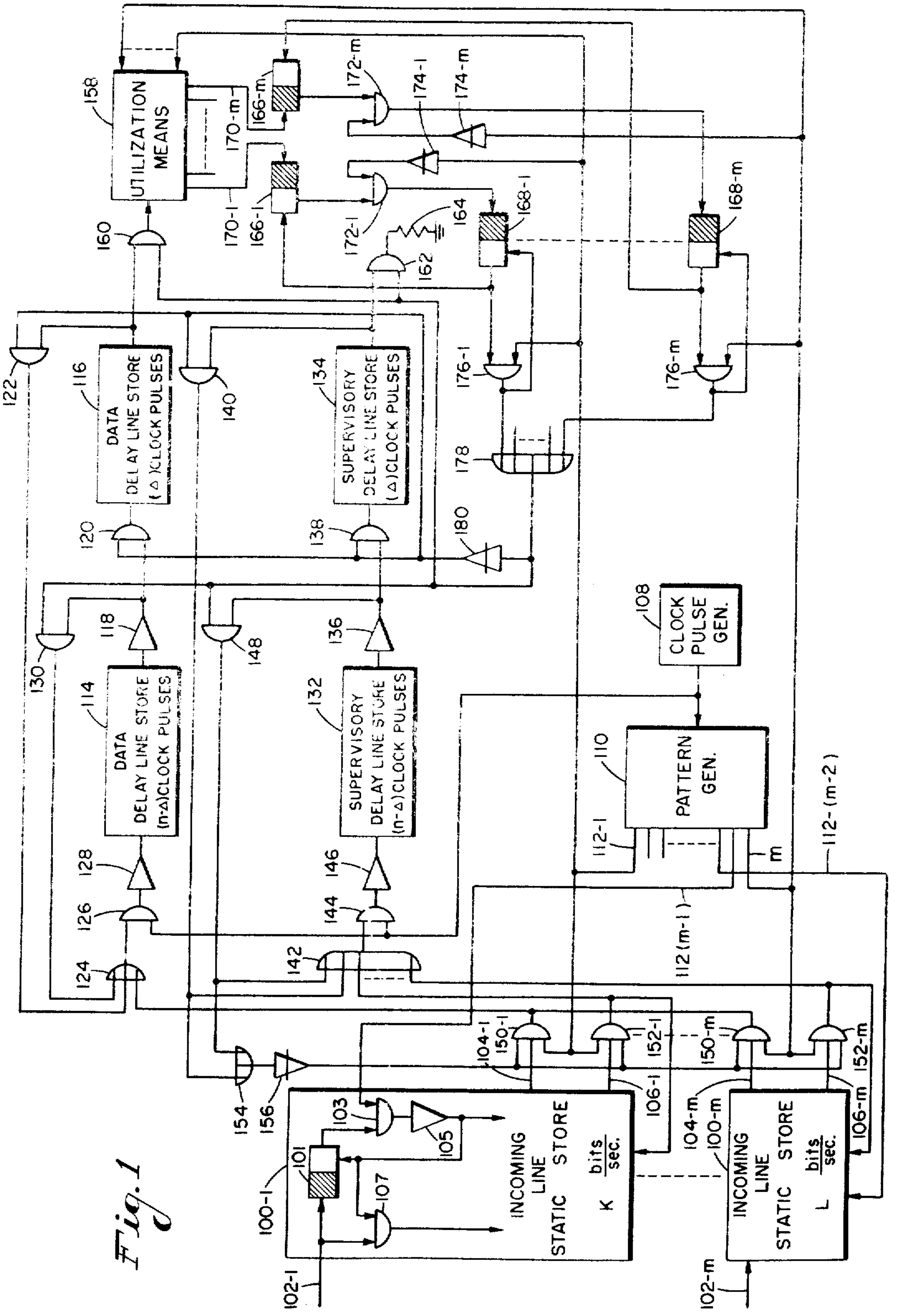
Figure 2:
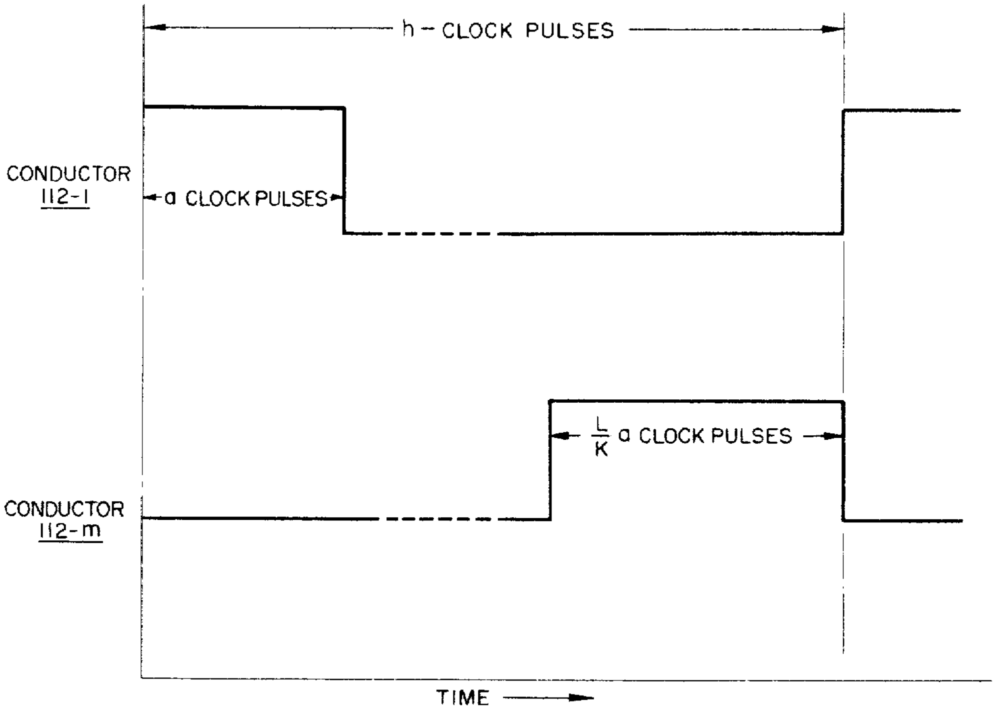

These and other objects, features and advantages of the present invention will become more apparent from the following detailed description taken together with the accompanying drawings in which;

FIG. 1 is a block diagram of an illustrative embodiment of the present invention, and FIG. 2 is a timing chart helpful in understanding the operation of the present invention.

Referring now to FIG. 1, a plurality of input means, only the first and last of which are shown, consists of incoming line static store 100–1 . . . 100–*m*. Respectively coupled to each incoming line static store is an individual incoming line, such as incoming line 102–1 . . . 102–*m*. Each of these lines applies bits of binary data to the incoming line static store to which it is coupled at a rate individually characteristic thereof. Thus, as shown, incoming line static store 100–1 receives binary data at a rate of K bits per second, while incoming line static store 100–*m* receives binary data at a rate of L bits per second.

For illustrative purposes it is assumed that a bit manifesting a binary "zero" consists of a momentary spike on an incoming line, while a bit manifesting a binary "one" consists of a mark pulse of relatively long duration.

As shown in detail in incoming line static store 100–1, an input flip-flop 101 is set by the presence of a momentary spike or the leading edge of a mark pulse on incoming line 102–1. When normally closed input AND gate 103 is opened in a manner described below, the output therefrom is passed through amplifier 105, which has a small inherent delay which is slightly longer than a momentary spike but much shorter than the duration of a mark pulse. An output from amplifier 105 manifests the presence of a bit.

As shown, the output of amplifier 105 is used to reset input flip-flop 101 and is also applied as a first input to AND gate 107. Incoming line 102–1 is connected as a second input to AND gate 107. An output from AND gate 107 will be obtained only if an applied bit comprises a mark pulse manifesting a binary "one." In addition, the incoming line static stores may include a pair of bistable devices, such as flip-flops, square loop cores, etc., not shown in detail, which are respectively set by the output of the amplifier 105 thereof and the AND gate 107 thereof. Each of the incoming line static stores includes two separate output conductors. The first output conductors, such as output conductors 104–1 . . . 104–*m* produce a mark thereon only in response to the value of a binary bit stored by the incoming line static store corresponding thereto manifesting a binary "one." The second output conductors from the incoming line static stores, such as conductors 106–1 . . . 106–*m*, produce a mark therein in response to the incoming line static store individual thereto storing a binary bit regardless of the particular value thereof.

Further shown in FIG. 1 is clock pulse generator 108 for generating clock pulses at a predetermined repetition rate. Clock pulses from clock pulse generator 108 are applied as an input to pattern generator 110. Pattern generator 110 may include a ring-connected counter and other conventional logic circuitry connected thereto for producing on output conductors 112–1 . . . 112–*m*, respectively, of pattern generator 110 separate mutually-exclusively occurring cell pulses in response to each successive group of $n$ successive clock pulses, to thereby form a time frame composed of $n$ time intervals, each time interval having a duration equal to a clock pulse. The repetition rate of clock pulse generator is sufficiently high so that the duration of a time frame is less than the minimum interval between successive incoming bits. Each of the cell pulses has a duration equal to some plural integral number greater than an integral number $\Delta$ of successive time intervals, which is greater in duration than the short inherent delay of amplifier 105. The number of time intervals or clock pulses included in various different cell pulses is not necessarily the same, as will be explained in detail below.

As shown in FIG. 1, each of output conductors 112–1 . . . 112–*m* of pattern generator 110 is connected to the input AND gate of that incoming line static store succeeding by two the corresponding incoming line static store, i.e., output conductor 112—$(m-2)$ is connected to input AND gate of incoming line static store 100–*m*, output conductor 112—$(m-1)$ is connected to the input AND gate of incoming line static store 100–1, etc.

Further shown in FIG. 1, is a data storage means comprising data delay line store 114 having its output connected to the input of data delay line store 116 through amplifier 118 and a normally open AND gate 120. The output of data delay line store 116 is recirculated to the input of data delay line store 114 through normally open AND gate 122, OR gate 124, AND gate 126, which is opened in response to each clock pulse, and amplifier 128. In addition, the output of data delay line store 114 may be recirculated to the input thereof through amplifier 118, normally closed AND gate 130, OR gate 124, AND gate 126 and amplifier 128. As shown, data delay line store 114 provides a delay equal to $(n-\Delta)$ clock pulses, while data delay line store 116 provides a delay of $\Delta$ clock pulses.

Further shown in FIG. 1, is input control means including supervisory delay line store 132 having its output connected to the input of supervisory delay line store 134 through amplifier 136 and normally open AND gate 138. The output of supervisory delay line store 134 is recirculated to the input of supervisory delay line store 132 through normally open AND gate 140, OR gate 142, AND gate 144, which is opened in response to each clock pulse, and amplifier 146. The output of supervisory delay line store 132 may also be recirculated to the input thereof through amplifier 136, normally closed AND gate 148, OR gate 142, AND gate 144 and amplifier 146. Supervisory delay line store 132 provides a delay of $(n-\Delta)$ clock pulses and supervisory delay line store 134 provides a delay of $\Delta$ clock pulses.

As shown, the first output conductors of the incoming line static store, such as output conductors 104–1 . . . 104–*m*, are individually connected as a first input to corresponding AND gates, such as AND gates 150–1 . . . 150–*m*, and the second output conductors of the incoming line static stores, such as output conductors 106–1 . . . 106–*m*, are individually connected as a first input to corresponding AND gates 152–1 . . . 152–*m*. The output of AND gate 140 or the output of AND gate 148 is passed through OR gate 154 and inverter 156 and applied as a second input to all of AND gates 150–1 . . . 150–*m* and all of AND gates 152–1 . . . 152–*m*. In addition, output conductors 112–1 of pattern generator 110 is connected as a third input to AND gates 150–1 and 152–1. In a similar manner, each of the other output conductors of pattern generator 110 is connected as a third input to a corresponding pair of AND gates 150 and 152, so that output conductor 112–*m* of pattern generator 110 is connected as a third input to AND gates 150–*m* and 152–*m*. The output of all of AND gates 150–1 . . . 150-*m* are connected in multiple as an input to data delay line store 114 through OR gate 124, AND gate 126 and amplifier 128. The respective outputs of AND gates 152–1 . . . 152–*m* are individually connected to the corresponding incoming line static store to effect the resetting of the bistable devices therein and thereby remove any marking which may be present on either the first or second output conductors thereof. The respective outputs of AND gates 152–1 . . . 152–*m* are also connected as a group to supervisory delay line store 152 through OR gate 142, AND gate 144 and amplifier 146.

Further shown in FIG. 1, is utilization means 158 and output control means including normally closed AND gate 160 for applying the output of data delay line store 116 to the input of utilization means 158. Also included in the output control means is normally closed AND gate 162 for applying the output of supervisory delay line store 134 to load resistance 164, a first group of flip-flops 166–1 . . . 166–1*m* and a second group of flip-flops 168–1 . . . 168-*m*. Utilization means 158 is capable of providing individual momentary command signals on output conductors 170–1 . . . 170–*m* thereof, which are connected as an input to a corresponding one of flip-flops 166–1 . . . 166–*m* to effect the setting thereof. The respective outputs of flip-flops 166–1 . . . 166–*m* are applied as a first input to corresponding AND gates 172–1 . . . 172–*m*. Respective ones of output conductors 112–1 . . . 112-*m* are applied through corresponding ones of inverters 174–1 . . . 174–*m* as a second input to corresponding ones of AND gates 172–1 . . . 172–*m*. The respective outputs of AND gates 172–1 . . . 172–*m* are applied as respective inputs to corresponding ones of flip-flops 168–1 . . . 168–*m*. The respective ones of the outputs of flip-flops 168–1 . . . 168–*m* are applied as a first input to corresponding AND gates 176–1 . . . 176-*m*, and also as an input to corresponding ones of flip-flops 166–1 . . . 166–*m* to effect the resetting thereof. Respective ones of output conductors 112–1 . . . 112–*m* from pattern generator 110 are applied as a second input to AND gates 176–1 . . . 176–*m* and also may be applied as respective inputs to an output steering circuit which may be included in utilization means 158. The respective outputs of AND gates 176–1 . . . 176–*m* are applied through OR gate 178 to effect the opening of normally closed AND gates 130, 148, 160 and 162. Also the respective outputs of AND gates 176–1 . . . 176–*m* are applied through OR gate 178 and inverter 180 to effect the closing of normally open AND gates 120, 122, 138 and 140. Further the respective outputs of AND gates 176–1 . . . 176–*m* are applied as inputs to corresponding ones of flip-flops 168–1 . . . 168–*m* to effect the resetting thereof only in response to the lagging edge of the respective outputs of AND gates 176–1 . . . 176–*m*.

Considering now the operation of the illustrative embodiment of the invention, assume first of all the delay line stores have no information stored therein. Assuming that the first bit applied from incoming line 102–1 is a momentary spike manifesting a binary "zero," input flip-flop 101 will be set thereby. Since the application of bits to the various incoming line stores is completely asynchronous with the operation of pattern generator 110, a cell pulse may or may not be present on conductor 112—$(m-1)$ at the instant that input flip-flop 101 is set. If a cell pulse is then present on conductor 112—$(m-1)$, input AND gate 103 will immediately produce an output which will be passed through amplifier 105 and after the inherent delay provided thereby will reset input flip-flop 101 and set one of the bistable devices in incoming line static store 100–1 to provide an output on conductor 106–1.

If a cell pulse is not present on conductor 112—$(m-1)$ at the instant that input flip-flop 101 is set, nothing will happen until a cell pulse appears on conductor $$112-(m-1)$$

when input AND gate 103 is opened to thereby reset input flip-flop 101 and set the bistable device of incoming line static store 100–1 to produce an output on conductor 106–1 after the inherent delay of amplifier 105. In any case, since the inherent delay of amplifier 105 is less than the duration of a cell pulse, when the next cell pulse on conductor 112–1 appears conductor 106–1 will already be applying an input to conductor 152–1.

Since it has been assumed that the first bit applied to incoming line 102–1 manifests a binary "zero," AND gate 107 will not be opened and there will be no output present on conductor 104–1.

During the first clock pulse period included within the cell pulse appearing on conductor 112–1, AND gate 152–1 will be opened and an output pulse therefrom will be applied to reset the bistable device of incoming line static store 100–1 which produced the output on conductor 106–1 and will also be applied through OR gate 142, AND gate 144 and amplifier 146 to the input of supervisory delay line store 132. During each subsequent time frame period, this stored pulse will be recirculated, passing through delay line store 132, amplifier 136, gate 138, supervisory delay line store 134, gates 140, 142 and 144 and amplifier 146. Furthermore, during the first occurring clock pulse period included within the cell pulse appearing on conductor 112–1 of each subsequent time frame period this recirculated pulse will pass through gate 154 and inverter 156 to maintain all of AND gates 150–1 . . . 150–*m* and all of AND gates 152–1 . . . 152–*m* closed.

If it is now assumed that that the next bit arriving on incomig line 102–1 manifests a binary "one," input flip-flop 101, input AND gate 103, and amplifier 105 will operate in the manner already described to again set the bistable device of incoming line store 100–1 to produce an output on conductor 106–1. In addition, since this second bit manifests a binary "one," AND gate 107 will be opened to set the bistable device of incoming line static store 100–1 to produce an output on conductor 104–1.

During the first clock pulse period included within the next occurring cell pulse appearing on conductor 112–1, AND gates 150–1 and 152–1 will be maintained closed by the previously stored pulse in this time position in the supervisory delay line store which is applied at this time to inverter 156. However, during the second occurring clock pulse period included within the cell pulse appearing on conductor 112–1 both AND gates 150–1 and 152–1 will be opened resulting in a pulse being stored in this time position in both the data delay line store and the supervisory delay line store, as well as in the resetting of the bistable device in incoming line static store 100–1.

In a similar manner, each successive bit applied to incoming line static store 100–1 will be sampled only once and stored in the first-occurring free time position within a cell of time positions in the supervisory delay line store, which cell of time positions is determined by the cell pulse appearing on conductor 112–1. Further, successive bits applied to each of the other incoming line static stores will be stored in like manner in each of the other cells of time positions of the supervisory delay line store determined by the cell pulse appearing on the conductor corresponding to that incoming line static store.

It will also be seen that each bit manifesting a binary "one" only will be stored in the data delay line store in a time position corresponding to the time position in which that bit is stored in the supervisory delay line store.

As implied earlier, the number of clock pulse periods included within each cell pulse is made proportional to the maximum rate at which bits may be applied to the corresponding incoming line static store. This is shown in FIG. 2, wherein the cell pulse appearing on the conductor 112–1, corresponding to incoming line static store 100–1, which has bits applied thereto at a maximum rate of K bits per second, has a duration equal to *a* clock pulse periods included within the *n* clock pulse periods of the time frame, and wherein the cell pulse appearing on the conductor **112–*m* corresponding to the incoming line static store 100–*m***, which has bits applied thereto at a maximum rate of L bits per second, has a duration equal to $L/K\ a$ clock pulse periods included within the *n* clock pulse period of the time frame.

When utilization means 158 desires to read out stored information originating on one of the incoming lines, it places a momentary command signal on an appropriate one of conductors **170–1 . . . 170–*m*. For instance, if utilization means places a momentary command signal on conductor 170–1, flipflop 166–1 will be set. The setting of flip-flop 166–1 will immediately cause the setting of flip-flop 168–1 if at this time a cell pulse is not appearing on conductor 112–1. However, if a cell pulse is at this time appearing on conductor 112–1, flip-flop 168–1 will not be set until the termination of the cell pulse. The setting of flip-flop 168–1 results in the resetting of flip-flop 166–1 and also during the next time frame when the cell pulse on conductor 112–1 reappears, an output from AND gate 176–1 will cause normally open AND gates 120, 122, 138 and 140 to be closed, and normally closed AND gates 130, 148, 160 and 162 to be opened for the entire duration of the cell pulse appearing on conductor 112–1. This will result in the data stored in the first Δ time positions included within the cell pulse appearing on conductor 112–1 to be applied to the utilization means and also the advance of the time position in which each of the remaining bits of data is stored by Δ time positions. Also, this will result in the supervisory bits stored in the first Δ time positions included within the cell pulse appearing on conductor 112–1 to be dissipated in load resistance 164** and also in the advance of the time positions in which each of the remaining supervisory bits of data is stored by Δ time positions.

The trailing edge of the output from AND gate 176–1, which occurs exactly at the end of the cell pulse appearing on conductor 112–1, is utilized to reset flip-flop 168–1. Therefore, immediately on the termination of the cell pulse appearing on conductor 112–1 gates 120, 122, 138 and 140 are reopened, AND gates 130, 148, 160 and 162 are reclosed. Thus, none of the stored data and supervisory bits originating in incoming line static stores other than incoming line static store 100–1 are advanced, but continue to be stored in the same respective time positions.

In a similar manner, a command signal on any other one of conductors **170–1 . . . 170–*m* will result in the reading out of stored data to utilization means 158 originating only in the incoming line static stores corresponding to the one of conductors 170–1 . . . 170–*m*** to which a command signal is applied.

The data received by utilization means 158 from AND gate 160 may be steered under the control of the cell pulses of the respective cell pulse on conductors **112–1 . . . 112–*m* applied thereto, so that data originating in the different incoming line static stores may be kept separate in utilization means 158**, if this is desired.

Although only an illustrative embodiment of the present invention has been described in detail, it is not intended that the invention be restricted thereto, but that it be limited only by the true spirit and scope of the appended claims.

What is claimed is:

1. In a data handling system, a multiple shift register buffer store for binary data received form a given plurality of separate input means and for supplying stored data to utilization means on command therefrom, said buffer store comprising a clock pulse generator for generating clock pulses at a predetermined repetition rate; a cyclically-operated pattern generator coupled to said clock pulse generator and having separate output conductors corresponding respectively to each of said given plurality of input means for producing a separate mutually-exclusively occurring cell pulse on each of said output conductors in response to each successive group of a predetermined number of successive clock pulses, whereby said successive groups form a time frame composed of a plurality of time intervals equal in number to said predetermined number and each time interval has a duration equal to a clock pulse period, each of said cell pulses having a duration equal to some plural integral number greater than a given integral number of successive time intervals; storage means having separate positions equal in number to said predetermined number, each position corresponding to a different one of said time intervals and capable of storing the binary value of a bit, whereby said storage means is divided into separate cells each of which is composed of those adjacent positions corresponding to those time intervals included within each respective cell pulse and each cell of said storage means corresponds to a different one of said input means; input control means coupled to said plurality of input means, said output conductors of said pattern generator and said storage means and responsive to the presence at any of said input means of each bit of binary data for sampling the value of that bit only once and storing the value of that sample bit in the first-occurring position unoccupied by a previously stored bit of the cell corresponding to that input means at which that bit is present, and output control means coupled to said utilization means, said storage means and to said output conductors, of said pattern generator and responsive to a command signal manifesting a particular cell from said utilization means for transferring to said utilization means the stored value of the bits of binary data occupying the first given integral number of positions of said particular cell and transferring the stored value of the bit of binary data occupying each remaining position of said particular cell to a position which is said integral number of positions closer to the beginning of said particular cell.

2. The buffer store defined in claim 1, wherein the bit rate of one of said input means bears a given ratio to the bit rate of another of said input means and wherein the number of positions included within the cell corresponding to said one input means bears said given ratio to the number of positions within the cell corresponding to said other input means.

3. The buffer store defined in claim 1, wherein said storage means comprises recirculating data delay means including first and second delay lines, a normally open first gate coupling the output of said first delay line to the input of said second delay line, a normally open second gate coupling the output of said second delay line to the input of said first delay line, and a normally closed third gate coupling the output of said first delay line to the input thereof, said first delay line providing a delay equal to said time frame minus said given integral number of time intervals and said second delay line providing a delay equal to said given integral number of time intervals, and wherein said output control means comprises a normally closed fourth gate coupling the output of said second delay line to said utilization means and switching means coupled to said utilization means, said output conductors of said pattern generator and said first, second, third and fourth gates and responsive to said command signal from said utilization means for closing said first and second gates and opening said third and fourth gates for only an entire cell pulse corresponding to said particular cell.

4. The buffer store defined in claim 3, wherein said input control means comprises recirculating supervisory delay means including third and fourth delay lines, said third delay line providing a delay equal to said time frame minus said given integral number of time intervals and said second delay line providing a delay equal to said given integral number of time intervals, a normally open fifth gate coupling the output of said third delay line to the input of said fourth delay line, a normally open sixth gate coupling the output of said fourth delay line to the input of said third delay line, a normally closed seventh gate coupling the output of said third delay line to the input thereof, load resistance means, a normally closed eighth gate coupling the output of said fourth delay line to said load resistance means, logic circuit means coupled to said plurality of input means, said output conductors of said pattern generator, the inputs of said first and third delay lines and to said clock pulse generator and responsive during a time interval of a time frame to the concurrent absence of a recirculated clock pulse at the input of said third delay line and the presence of a bit of binary data at any input means and the presence of a cell pulse corresponding to that input means for applying a clock pulse to the input of said third delay line during that time interval and only if that bit of binary data has a particular binary value applying a clock pulse to the input of said first delay line during that time interval and for rendering said logic means non-responsive to that bit of binary data anytime subsequent to that time interval of that time frame, and wherein said output control means includes means for coupling said switching means thereof to said fifth, sixth, seventh and eighth gates to effect the closing of said fifth and sixth gates and the opening of said seventh and eighth gates concurrently with the closing of said first and second gates and the opening of said third and fourth gates.

5. The buffer store defined in claim 4, wherein the bit rate of one of said input means bears a given ratio to the bit rate of another of said input means and wherein the number of positions included within the cell corresponding to said one input means bears said given ratio to the number of positions within the cell corresponding to said other input means.

No references cited.

ROBERT C. BAILEY, *Primary Examiner.*

P. HENON, *Assistant Examiner.*